United States Patent [19]
Charter et al.

[11] 4,117,067
[45] Sep. 26, 1978

[54] HIGH PRODUCTION METHOD OF PRODUCING GLASS FIBER RESIN COMPOSITES AND ARTICLES PRODUCED THEREBY

[75] Inventors: Kenneth F. Charter, Newark, Ohio; John R. Miller, Scottsburg, Ind.; David W. Garrett, Newark, Ohio

[73] Assignee: Owens-Corning Fiberglas Corporation, Toledo, Ohio

[21] Appl. No.: 645,483

[22] Filed: Dec. 31, 1975

[51] Int. Cl.² ............................................. B29C 5/06
[52] U.S. Cl. ................................... 264/119; 264/120; 264/121; 264/128
[58] Field of Search ................... 264/82, 83, 115, 128, 264/121, 119, 120

[56] References Cited
U.S. PATENT DOCUMENTS

| B 372,232 | 3/1976 | Johnson | 264/83 |
|---|---|---|---|
| 2,903,389 | 9/1959 | Fujita | 264/128 |
| 3,328,383 | 6/1967 | Roscher et al. | 264/115 |
| 3,442,998 | 5/1969 | Wiltshire | 264/128 |
| 3,583,679 | 6/1971 | Godley | 264/128 |
| 3,969,460 | 7/1976 | Fremont | 264/128 |

FOREIGN PATENT DOCUMENTS 815,036  6/1959  United Kingdom ..................... 264/128

Primary Examiner—Robert F. White
Assistant Examiner—James R. Hall
Attorney, Agent, or Firm—John W. Overman; Philip R. Cloutier

[57] ABSTRACT

A liquid binder forming material is added to a preform mold, dispersed chopped glass fiber strand is allowed to free fall into the preform mold to build up a layer of chopped fibers wherein substantially all of the strand is horizontal but otherwise randomly oriented, and the layer of chopped strand is forced down into the resin until completely immersed therein. Preferably, thereafter, the preforms so produced are stacked into tubular magazines with separator sheets between the preforms in each magazine; and the magazines are transported first to a maturation room where the viscosity of the binder forming material is increased to above 20 million centipoise, and then to matched metal dies where the preforms are sequentially fed out of the magazine to between the dies which shape and cure the preforms.

4 Claims, 15 Drawing Figures

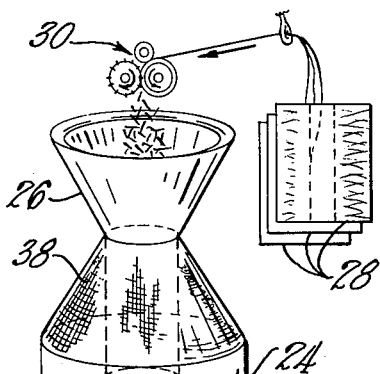
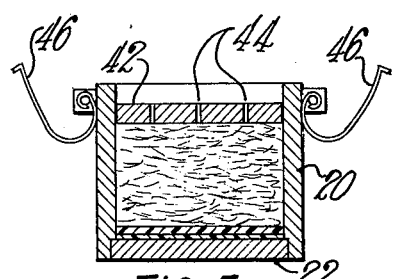
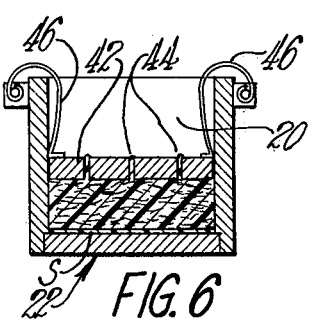
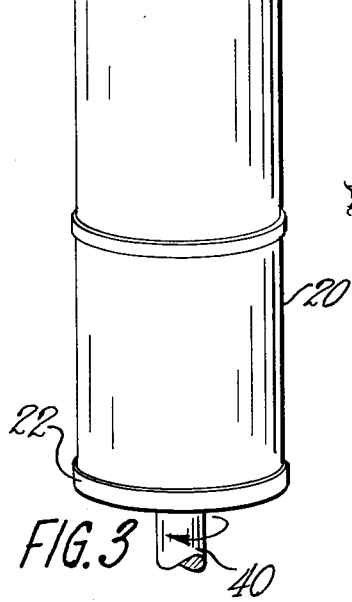
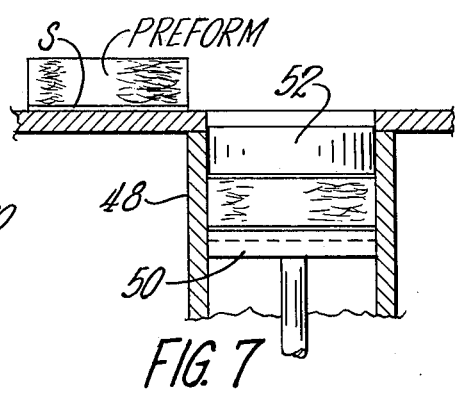
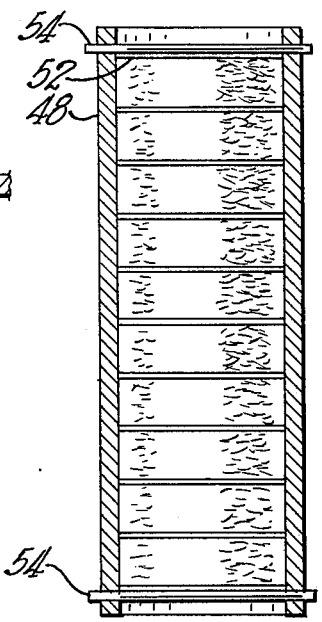
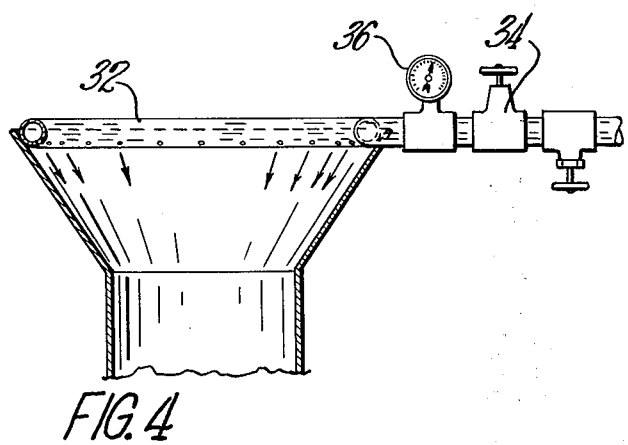

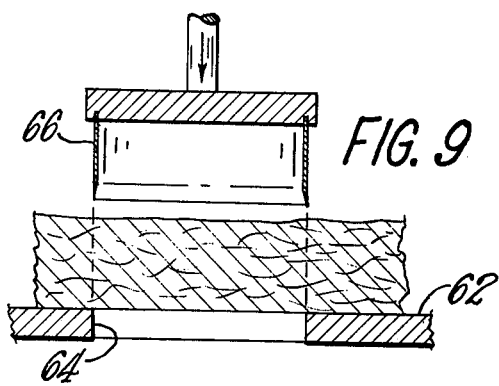
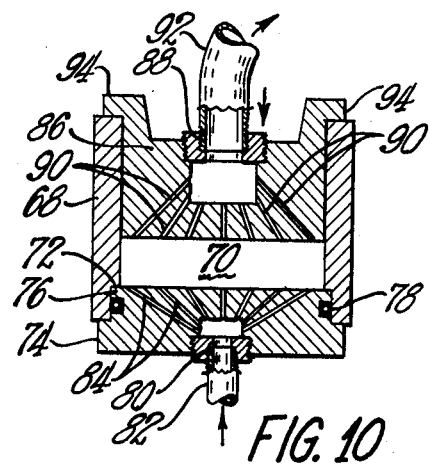
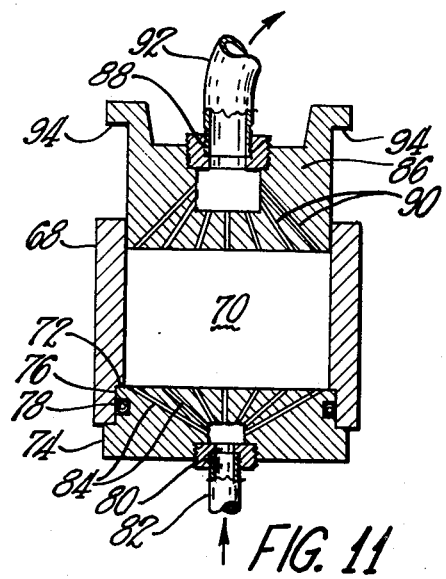
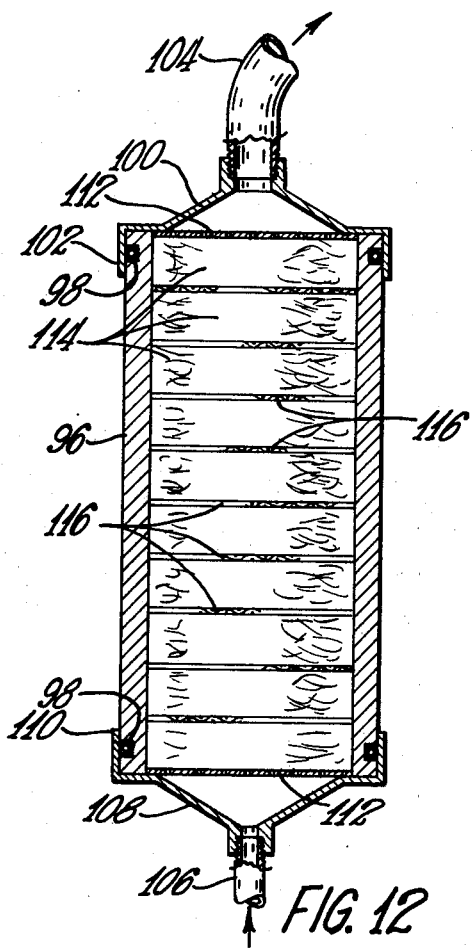

3,117,067

HIGH PRODUCTION METHOD OF PRODUCING GLASS FIBER RESIN COMPOSITES AND ARTICLES PRODUCED THEREBY

BACKGROUND OF THE INVENTION

The present invention relates to a method of making fiber reinforced articles; and more particularly to a method of producing articles from glass fiber reinforced polymers or plastics which materials are commonly called FRP.

At this writing, the art of producing glass fiber reinforced plastic articles has progressed to the point where fiber prominence in the finished molded parts and depressions called "sink" over rib areas in the molded parts have been generally solved. With these problems solved it is now possible to make large thin contoured sections from FRP which were formerly made by bending sheet metal into the desired shape as is done for example in the forming of automotive hoods and fenders, and shower stalls, etc.. In order that the production of such articles could become commercially feasible, it was necessary to produce a moldable mixture of the glass fibers and the plastic prepolymers in a nonsticky, handleable condition; and this aspect of the art has been accomplished by the development of sheet molding compounds, commonly called SMC.

Sheet molding compounds, as the name implies, are sheets of mixtures of glass fibers and prepolymers that have been cured to a "b-stage" in which the prepolymers are no longer runny and in which the mixture is sufficiently solid that it can be handled as a sheet and to allow the glass and resin to flow together uniformly in the molding operation. Such sheets are fed to presses that flow, contour and cure the sheets in a process that is analogous in some respects to the stamping operation used by the sheet steel industry. Sheet molding compounds are made between separation sheets by putting a thin layer of a liquid hardenable resin on a lower separation sheet, a layer of chopped fibers on top of the resin layer, followed by another layer of the resin on top of the layer of chopped fibers. In the process, air is trapped in the layer of fibers between the two layers of resin, and a kneading action is utilized to remove this air from between the fibers. This is usually accomplished by passing the layers of materials through one or more nips of compression rolls. The problem of air removal is a difficult one, and at this writing the problem of air removal has limited the production of sheet molding compounds to a maximum thickness of approximately ¼ inch. Still other problems exist with sheet molding compounds in that when the materials are deeply drawn or extruded, the fibers of the mixture stay behind and only its resin flows into the deeply drawn or extruded areas. Sheet molding compounds have still another limitation in that the fiber loadings (fiber-binder volume ratios) which the art has been able to produce are generally below 50%, with the commercial products being in the range of from approximately 15% to approximately 32% fiber. It is known that FRP articles have higher strengths at higher fiber loadings, but the prior art attempts to make sheet molding compounds of more than 50% fiber have resulted in nonuniform materials in which the percent of glass varied appreciably. These materials have the serious drawback that products made therefrom have an even greater decrease in fiber loading in the extruded areas where the fibers are most needed. A still further shortcoming is that sheet molding compounds can not be made of a thickness of more than approximately ¼ inch; and delamination occurs when parts are made from multiple layers of the sheet molding compound. Another problem is that variations in the percent of glass leads to "short shots" i.e. parts made when the mold is incompletely filled. Glass weighs more than resin. A charge which weighs the correct amount but which has too high a glass content, does not have sufficient volume to fill the mold and a "short shot" thereby results.

An object of the present invention is the provision of a new and improved method of making FRP articles and/or materials wherein the materials can be deeply extruded without producing resin rich areas, and wherein the fibers move along with the matrix forming materials into the extruded areas.

Another object of the invention is the provision of a new and improved method of the above described type wherein parts of thicknesses commonly encountered in the metal casting and/or diecasting arts can be produced, and wherein the FRP material will flow into fillets and webs without depletion in fiber loading.

Another object of the invention is the provision of a new and improved method of the above described type wherein parts having a fiber loading of more than 50% can be easily produced.

Another object of the invention is the provision of a new and improved process for causing chopped glass fibers to lay down in a more planar and compact arrangement than has been produced heretofore.

Another object is the production of a press charging billet having a precise glass fiber to resin ratio in a highly automated manner.

A still further object of the invention is the provision of a new and improved process for producing and curing of the billets in maturation tubes to facilitate handling and reduce the storage space required for maturation.

Still further objects and advantages of the invention will become apparent to those skilled in the art to which the invention relates from the following description of several preferred embodiments that are described with reference to the accompanying drawings which form a part of this specification.

BRIEF DESCRIPTION OF THE DRAWINGS

FIG. 3 is a somewhat schematic isometric elevational view taken approximately on the line 3—3 of FIG. 2.

FIG. 4 is an enlarged sectional view of the top portion of the equipment shown in FIG. 3.

FIG. 5 is a sectional view of the bottom portion of the apparatus shown in FIG. 3, at an intermediate stage in its operation of making a preform.

FIG. 6 is a sectional view corresponding to FIG. 5, but showing the apparatus at the completion of its preform molding operation.

FIG. 7 is a schematic sectional view taken approximately on the line 7—7 of FIG. 2, and showing the start of the filling of a magazine with the preforms.

FIG. 8 is a schematic view similar to FIG. 7 but showing the magazine completely filled with preforms.

FIG. 9 is a schematic sectional view showing a fiber blanking operation that is utilized in another embodiment of the invention.

FIG. 10 is a schematic sectional view of apparatus for impregnating fibers with resin according to another embodiment of the invention.

FIG. 11 is a schematic sectional view of apparatus similar to that of FIG. 10, but which operates according to still another embodiment of the present invention.

FIG. 12 is a schematic sectional view of apparatus for b-staging preforms having an epoxy binder according to still another embodiment of the invention.

DESCRIPTION OF THE PREFERRED EMBODIMENTS

According to the present invention, it has been discovered that it is possible to produce an FRP molding compound which can be extruded into relatively thin sections without giving resin rich areas that are depleted in fiber reinforcement. It has been determined that if the binder prepolymer is b-staged to a viscosity of approximately 20 million centipoise, or more, and if the fibers are not bent backwardly over other fibers or otherwise entangled, the fibers of the mixture will flow along with the b-staged matrix forming material. It has also been discovered that it is possible to produce a pack of fibers in which the fibers are not standing on end or entangled with substantially all of the fibers laying planar. It has further been discovered that it is possible to adequately wet out relatively thick packs of fibers without channeling if the pack extends between the sidewalls of a mold, and if a liquid matrix forming material having a viscosity between approxiamtely 800 and 3,000 centipoise is forced upwardly through the pack without appreciable turbulence or breaking of the interface so that the air is flushed from between the fibers ahead of the interface. The movement of the resin through the pack occurs most readily when the pack is relatively loose so that an advantage exists in at least starting the flow of liquid binder forming material through the pack while it is relatively uncompacted. However, there is also an advantage in compressing the pack to a degree wherein its volume, less the portion thereof occupied by the fibers, is just sufficient for the desired amount of binder to be incorporated with the fibers. The removal of a liquid hardenable binder can be messy and wasteful; so that in the most preferred embodiment, just enough binder forming material is added to the bottom of a mold to wet out a predetermined amount of fibers when the layer of the fibers is compressed to a degree that the liquid level rises to the top of the fiber layer.

Inasmuch as some of the discoveries of the invention make it possible to extrude thick layers of FRP molding compound reliably into thin sections without undergoing appreciable fiber depletion, it is now possible to fulfill still further objects wherein just the right amount of binder and fibers are added to matched metal molding dies to fill the molding dies without there being an excess. According to further aspects of the invention the charge for the molding dies is made as a preform in a highly automated process having a production rate comparable to that of die casting operations. These and other advantages can best be appreciated from an understanding of the following examples of several preferred embodiments. It will be understood that some of the principles above described will have utility for some purposes without using all of the principles above described, and that various modifications can be made in the individual steps to suit certain materials and or purposes.

EXAMPLE 1

Figure 1:
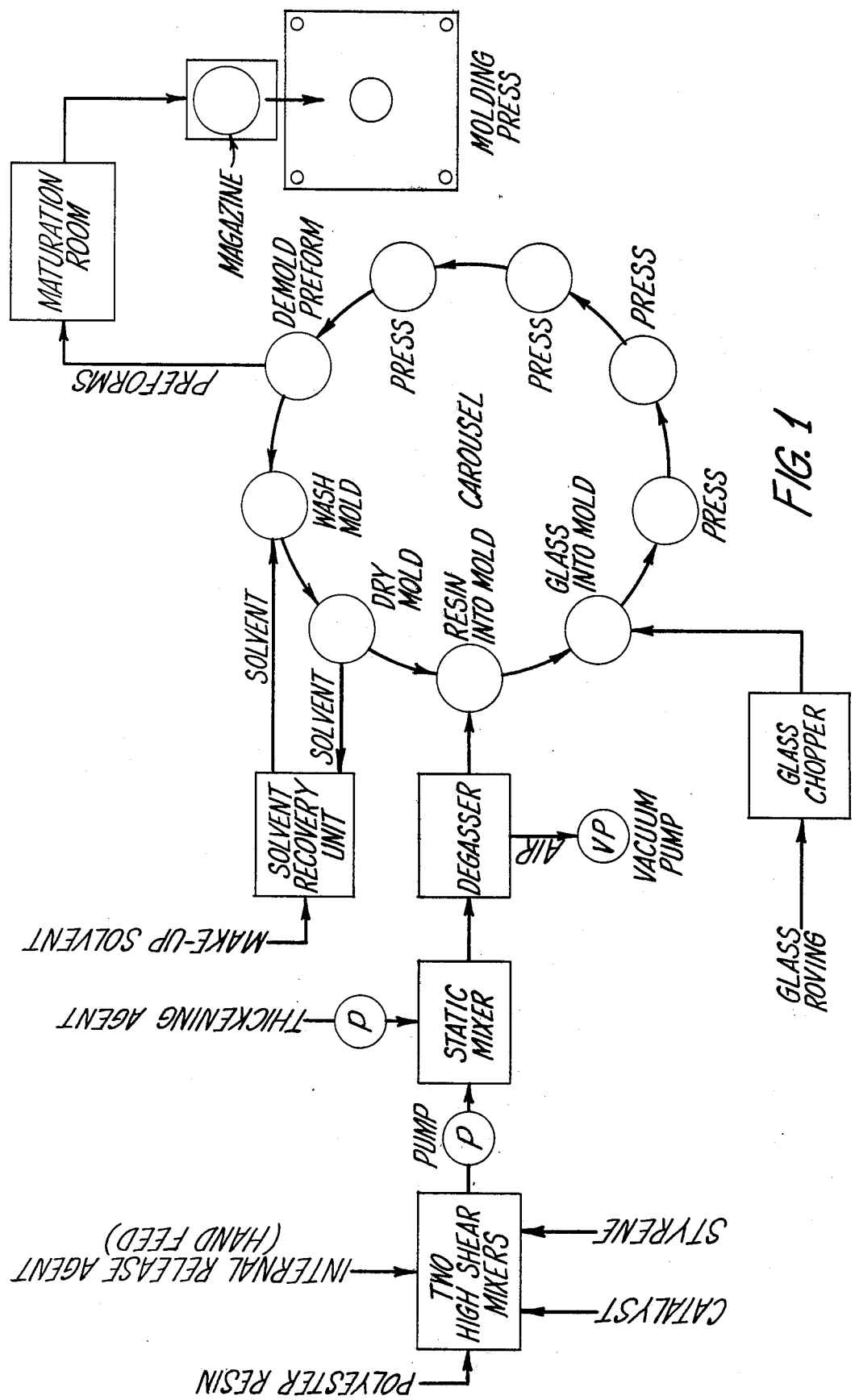
FIG. 1 is a schematic flow sheet of a preferred process embodying principles of the present invention.

It will be understood that the steps of the flow sheet of FIG. 1 can be used for the production of parts from substantially any combination of fiber and binder materials, and has particular advantages in glass fiber reinforced plastics or polymers. The process is capable of producing parts having a high glass content (exceeding 50% by volume). While there appears to be no practical maximum thickness to the parts that are produced by the process, it will have most application in making highly contoured parts of the type usually made by die-casting operations etc.. As previously explained, FIG. 2 of the drawings is a schematic equipment layout of the process shown in FIG. 1, and this process will now be described as making wheels for automotive vehicles having an integral rim and flange or spider of a glass fiber reinforce polyester material having a fiber loading of 56% by volume. A polyester prepolymer made by cooking 1.04 mols of propylene glycol, 0.33 mol of isophthalic acid, and 0.67 mol of maleic anhydride to an acid value of 18 is fed to a Baker-Perkins Roto Feed Mixer along with a zinc stearate mold release agent, styrene, and tertiary butyl perbenzoate (a free radical catalyst for the polyester resin). After being mixed in the mixer, the mixture is pumped to a static mixer to which is also added a metal oxide thickening agent (Magnesium hydroxide). In the static mixer, the materials pass through a series of turbulence producing baffles and the mixture is discharged to a vacuum degassing chamber from which air is withdrawn by means of a vacuum pump. The binder mixture so produced has the following composition in percent by weight:

| | |
|---|---|
| Polyester prepolymer above described | 83.7 |
| Filler (Calcium carbonate) | 8.4 |
| Thickening agent (Magnesium hydroxide) | 3.4 |
| Mold release agent (Zinc Stearate) | 2.1 |
| Solvent & cross linking agent (Styrene) | 1.6 |
| Catalyst (Tertiary Butyl Perbenzoate) | 0.8 |

This binder forming mixture has a viscosity of approximately 1,000 centipoise.

According to principles of the present invention, preforms can be made by charging a predetermined amount of glass fibers and a predetermined amount of a resin mixture to the preform mold. These amounts are calculated to give a precise fiber-binder ratio, which in the present example is 56%. It has been found that if the binder of the preform is thickened (b-staged) to above 20 million centipoise for some pressing applications and above 80 million for conditions that involve extensive extrusion, the binder forming material will not separate from the fibers and the fibers will be carried along in the extruded binder forming material, even in conditions similar to those encountered in die-casting operations. In the present example, the preform is made in a preform mold by first adding a predetermined amount of the resin binder forming material to the mold and a predetermined amount of chopped glass fibers on top of the binder forming liquid and by causing the binder forming material to completely wet out the fibers in the mold. The preforms so produced are sent to a maturation room where the binder forming material is thickened to a viscosity at or above 80 million centipoise. Following maturation, the individual preforms are fed to matched metal dies configured to provide an integral one piece wheel for an automobile having the usual rim, and flange or spider. In the embodiment shown in FIG. 1, the preforms are stacked into a magazine which is then moved to the maturation room where the preforms in the magazine are simultaneously matured, and following which, the magazine is moved to the press where the individual preforms are sequentially fed to the press. After the preforms are removed from the preform molds, the preform molds are washed with a solvent, following which, the solvent is removed by blowing warm air over the parts of the mold. The solvent from the washing operation, and the drying operation, is recovered and is used over and over again. The dried preform molds are then conveyed back to the resin filling station, and the cycle is repeated. It will be understood that a number of these preform molds will be used in any commercial process, and that these preform molds can be moved about using any commercial conveying mechanisms. With the apparatus shown in FIG. 2, however, the preform molds are conveyed by a carousel which is periodically indexed between stations wherein the various steps previously described are performed.

Figure 2:
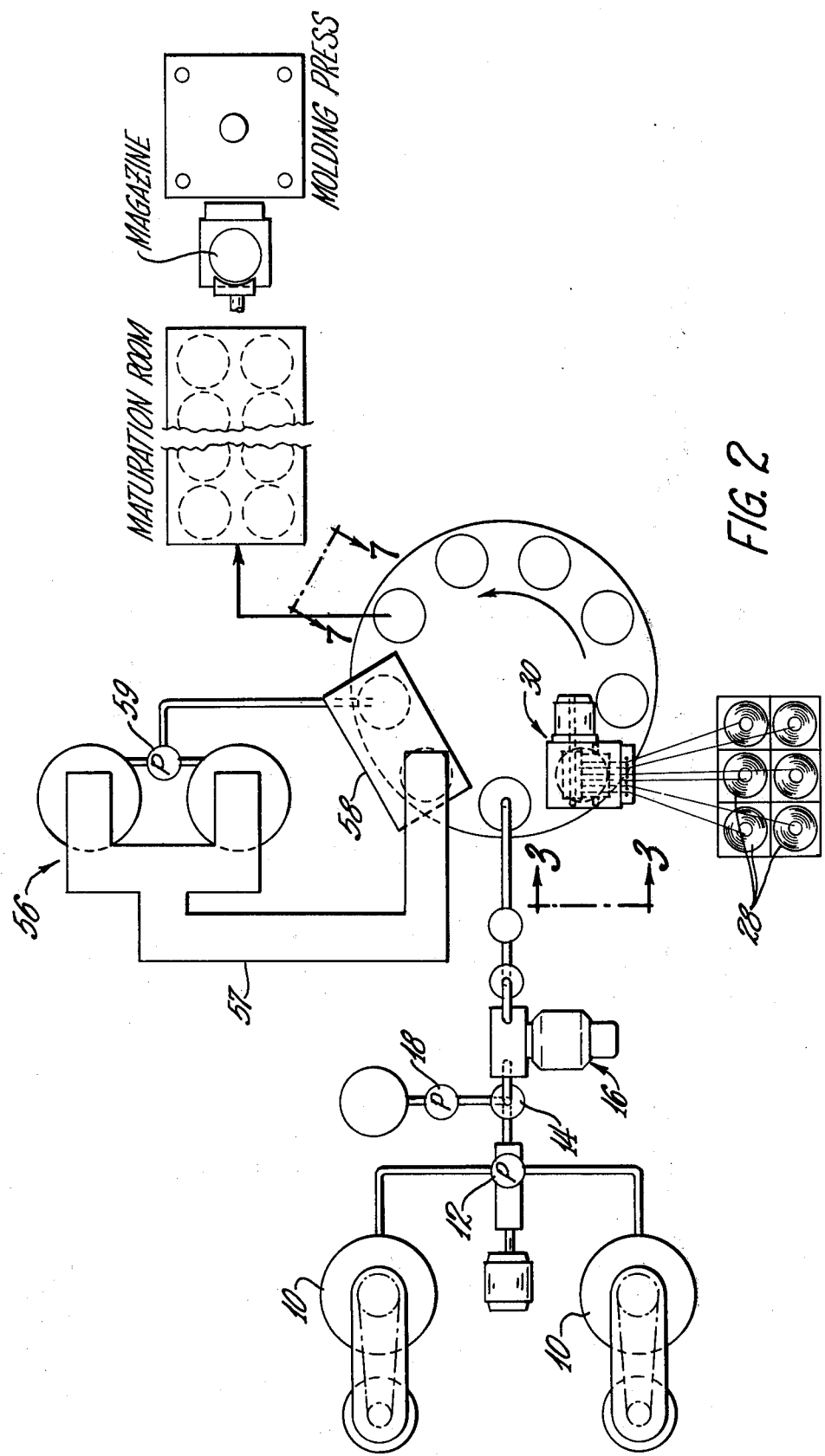
FIG. 2 is a schematic equipment layout which operates according to the principles of the flow sheet of FIG. 1.

Proceeding now to FIG. 2 of the drawings, two of the Baker-Perkins mixers 10 are utilized, so that one batch of the binder forming materials can be assembled while another batch of the materials is being thoroughly mixed. These materials are alternately valved to a pump 12 from which a continuous stream of the material is pumped to a static mixer 14 and then to a degassing accumulator 16 of commercial construction. A pump 18 takes suction on the degassing accumulator, and discharges the mixture to the preform mold. The pump 18 is a variable displacement type metering pump which can be adjusted to deliver a precise amount of material each time that it is actuated. The carousel is a table having nine small openings therethrough which are spaced evenly around the table and over which the preform molds are adapted to be supported. The pump 18 delivers its charge at the proper time to the first station of the carousel where it is received in a preform mold.

As best seen in FIGS. 2, 5 and 6, the preform mold comprises a cylindrical sidewall section 20 and a separable base 22 that effect a liquid tight seal therebetween. A plastic separation sheet S is placed in the bottom of the preform mold at the first station of the carousel, and the liquid binder forming material is added on top of the separation sheet. The carousel is then indexed to the second station wherein a filling tube 24 is brought down upon the upper end of the cylindrical sidewalls 20. A turn table, later described, is elevated at the second or fiber filling station through the carousel opening previously mentioned to lift the base 22 from the carousel, and rotate the preform mold at approximately 1 RPM. Chopped fibers are fed to the upper end of the filling tube 24 through a filling funnel 26 the neck of which projects down into the filling tube. A number of ends of continuous strand from packages 28 are fed to a conventional chopper 30 that is positioned directly over the top of the funnel 26. The chopper is run for a predetermined time interval that is started each time that the carousel indexes to discharge a predetermined amount of chopped fibers to the preform mold.

According to further principles of the invention the chopped strand is distributed over the bottom of the mold by an air stream. The air stream can be introduced as a centrally located jet but is preferably introduced as a curtain along the sidewalls. In the apparatus of the present embodiment, an air distribution ring 32 is located at the top of the funnel 26, and air flow thereto is controlled by a pressure regulator 34 which is adjusted to provide a predetermined air pressure as indicated by the pressure gauge 36. The air distribution ring has a plurality of small holes in the bottom side thereof for the purpose of directing a curtain of air down along the sidewalls of the funnel. The filling tube 24 and preform mold 22, 20 are air tight except for the opening between the top of the filling tube 24 and the filling funnel 26 and a conically shaped screen 38 is provided between the filling tube and the sidewalls to prevent fibers from being blown out into the room. It will be seen that the air that is discharged down the filling funnel 26 must change direction by approximately 180° in order to flow upwardly and out of the screen 38, and this reversal of direction causes the strand to spread out laterally over the preform mold. Inasmuch as the preform mold and the bottom end of the filling tube 20 are air tight, the individual lengths must fall through a generally dead air space before the chopped strand comes to rest at the bottom of the preform mold. The effect of the air stream and the free fall of the individual lengths of strand through a dead air space is such as to separate the lengths with air and cause the lengths to lay down in a unique pattern wherein all of the lengths are substantially, straight, horizontal and planar but randomly oriented in the plane to a greater degree than has ever been produced before without entanglement or knotting. The strand can have appreciable length, and in the process being described are approximately one inch long. It will also be seen that the fibers are dry and that most of the chopped lengths fall upon dry strand before being wetted by binder so that there is substantially no back bending or looping of the strands over each other. It has been found that this arrangement of the fibers is most conducive to good fiber flow during the extrusion that takes place later in the part making mold. To further aid in the uniform distribution of the fibers in the bottom of the mold, the mold is preferably rotated at approximately 10 to 60 RPM. This is accomplished by a turntable 40 that is positioned beneath the second station of the carousel and which moves upwardly to engage the base 22 and raise the cylindrical sidewalls 20 of the mold into engagement with the filling tube 24 at the start of the glass filling operation. After the desired amount of chopped glass is added, as determined by the timer, the turntable 40 drops downwardly from the carousel, the cylinder sidewalls 20 separate from the filling tube 24, and the carousel indexes to bring the preform mold to the third station of the carousel. The strand used in Example 1 contains 2040 continuous filaments having an average diameter of 0.00035 inch, and the strand is sized with approximately 1.0% of a polyvinyl acetate binder and vinyl silane.

At the third station of the carousel, a cylindrical compression plate 42, best seen in FIG. 5, is placed on top of the layer of fibers, and a press not shown slowly presses the layer of fibers down into the layer of resin in the bottom of the preform mold. Initially the fibers are in a loose condition, and the level of the resin rises up between the fibers as the fibers are forced down into the resin. There is very little turbulence of the resin as it rises and the fibers are laid down in such a manner that the liquid rises more rapidly along the side surfaces of the mold than it does at the center of the mold. The liquid-air interface stays intact however, and the last of the air escapes through the holes in the center of the piston. The liquid level of the resin rises quite rapidly at first and then more slowly as the fibers beneath the liquid level become more compacted to make room for the fibers that are above the interface. A plurality of vent openings 44 are provided in the plate 42, and when the liquid begins to rise in the vent openings 44 the compression is stopped, since all of the fibers have been encased in resin. Since a known quantity of resin and a known quantity of fibers were added to the preform mold, a precise fiber loading has been accomplished. Since the same amount of resin and the same amount of fibers are added to each preform mold either the pressure or the stroke of the ram of the press can be regulated to give the desired rise of the resin in the vent openings 44.

When the desired compaction of the fibers is produced, dogs 46 shown in FIG. 6 are swung into position to hold the plate in its lower most position. The carousel is then indexed to bring the preform mold to the fourth station of the carousel. In order to allow ample time for wet out, the preform mold is kept closed through the fourth and fifth stations.

After the carousel is moved into the sixth station of the carousel, the dogs 46 are swung out of position and the compression plate 42 is removed.

On the way to the seventh carousel station, suitable ramps catch the dogs 46 and raise the cylindrical sidewall portion 20 of the mold upwardly free and clear of the base 22.

After the preform and base 24 reach the seventh station, a piston slides the separation sheet S and the preform outwardly over the top of a magazine 48 where they come to rest on top of a compression plate 52 that rests on top of a piston 50 which is indexed downwardly each time the carousel indexes until enough preforms have been added to the magazine to fill the magazine. This operation is shown in FIG. 7. At this point, the preform can be pulled apart in layers of any thickness, and there is substantially no fiber tear out of the layers or vertically projecting fibers therefrom. After the magazine is filled with preforms, a plastic compression plate 52 (see FIG. 8) is added to the top of the magazine, the compression plate is pressed downwardly by a controlled amount, and pins or detents 54 are put into position to hold the compression plates 52 in place. The contents of the magazine will therefore comprise a unique type of billet wherein increments thereof are separated by separation sheets, whereas prior art billets are a single solid block of material which must be metered in some fashion into increments at the part forming mold.

Thereafter the magazine 48 is moved to a maturation room, which for polyester binders is kept at 90° F., to allow the thickening reaction between the metal oxide and the carboxyl groups of the binder resin.

During indexing through the next two stations of the carousel, the parts of the mold are washed and dried so that the preform mold can again be supplied to the first or resin charging station of the carousel in a clean and dry condition. This can be done by moving the parts of the mold from the carousel to a washer where a conveyor carries them through a solvent bath, a solvent spray and later through a drying chamber before they are put back onto the carousel. The washing can also be done in position on the carousel, and as shown in the drawings, the parts of the mold are washed with solvent at the eight carousel station, and the solvent is collected from beneath the carousel, and is drained to a solvent recovery unit 56. A hood 58 is provided over the eight and ninth carousel stations and a flow of air around the preform mold dries the mold. The air is conducted through conduit 57 to the solvent recovery unit 56 where the solvent is removed from the air, and is recirculated to the washing station by the pump 59. There are of course a plurality of preform molds circulating around the carousel, with at least one in each station, and others in any off carousel stations which serve the carousel.

At the part producing press or compression mold, individual preforms from the magazine 48 are slid sideways from the top of the magazine down into the bottom section of the matched metal dies forming the compression mold. The top and side sections of the matched metal dies are closed on the bottom section and the top section of the dies is forced downwardly to extrude the fibers and binder of the preform into all portions of the mold cavity. In the present Example, a 16 inch diameter automotive wheel is produced and the preform is ten inches in diameter. The rim of the wheel for receiving the tire extends vertically for approximately 6 inches, so that it can be seen that an extensive amount of extrusion must take place to move the fibers and binder into the portion of the mold cavity which forms the rim. The mold is heated for polyester resins to approximately 350° F and a pressure of approximately 2,000 psi based upon a sixteen inch diameter circle is utilized to effect extrusion of the preform material. The parts that are produced when sectioned show that there is substantially no change in the fiber loading in the extreme portions of the rim and in the web areas. The material in the base of the rim has a tensile strength of 21,000 psi, a flexural strength of 40,000 psi and a flexural modulus of 2 million. All of the above are determined at room temperature. At a temperature of 300° F the material still has a tensile strength of 21,000 psi.

It will be obvious that the processes above described can be performed with substantially any type of binder forming material, be it thermoplastic, or be it thermosetting. In the case of thermoplastic binder forming material, a thermoplastic solid polymer is thinned to a viscosity of 1,000 to 2,000 centipoise with solvent, and most of this solvent is removed in the maturation step. This can also be done with epoxys, and other thermosetting resins, although other types of b-staging mechanisms will usually be preferred for economic reasons when thermosetting prepolymers are utilized.

As previously indicated, various modifications can be made in the steps of the process above described. In some instances it may be possible to prepare fiber discs of the right diameter for the impregnation chamber by placing a mat having the fiber lay of the present invention over a die opening 64 and forcing a circular knife 66 down into the opening. In the embodiment shown in FIG. 10, a slightly different procedure is used for saturating the fiber layer with the resin. The preform mold shown in FIG. 10 has a cylindrical sidewall section 68 forming an internal cylindrical chamber 70 and the internal lower end of the sidewalls 68 are stepped as at 72. The mold also has a separable base 74 the upper surface of which contains a boss 76 having a sliding fit with respect to the stepped portion 72. An O-ring seal 78 is received in a groove in the cylindrical sidewalls of the boss 76 to effect a seal with respect to the stepped portion 72 of the sidewall section 68 of the mold. The upper edge of the boss 76 tightly engages the shoulder of the stepped portion 72 so that very little resin comes in contact with the seal 78. The base 74 has an appreciable thickness and is provided with a threaded opening 80 in its lower end for receiving a resin supply conduit 82 that is supplied with resin from a pump not shown. A plurality of distribution passages 84 proceed from the chamber 80 to the upper face of the boss 76 for supplying resin under pressure to the chamber 70. A compression plate 86 having a sliding fit with respect to the sidewalls 68 is positioned in the upper end of the chamber 70. The compression plate has a threaded opening 88 in its upper end which is communicated to its lower face by a plurality of passageways 90. A vacuum conduit 92 is threaded into the opening 88 and the conduit is connected to a separation chamber, not shown, to which vacuum is communicated for reasons which will later be explained. The compression plate 86 also has a plurality of stops 94 which engage the upper end of the sidewalls 68 when the distance between the compression plate 86 and the upper surface of the separable base 84 are spaced to provide a predetermined volume therebetween. A layer of fibers produced according to the procedures described with respect to FIGS. 1 through 8 is provided in the chamber 70 and the compression plate 86 is lowered into the chamber 90 until the stops 94 limit further movement. Thereafter resin under pressure is slowly pumped through the conduit 82 to fill the chamber 70 and flush air from between the fibers. The exiting air passes through the passageways 90 to the vacuum conduit 92; and after the interface of the resin reaches the top of the cavity 70, it also flows through the conduit 92 to the separator. The flow of resin through the fibers in the chamber 70, of course completely flushes all air therefrom. Thereafter the flow of resin is stopped, the compression plate 86 is removed, and the preform is loaded into a magazine, as was described for the embodiment shown in FIGS. 1 through 8.

In the embodiment shown in FIG. 11, the same equipment shown in FIG. 10 is utilized but a slightly different flushing procedure is used. A layer of fibers is put into the chamber 70 and the compression plate 86 is merely lowered into position onto the top of the uncompacted layer of fibers. Thereafter resin is pumped through the layer of fibers to flush the air therefrom. After the space between the fibers of the uncompacted layer is filled with resin, the flow of resin is stopped and the compression plate 86 is forced downwardly until the stops 94 engage the upper end of the sidewalls 68 and thereby provide the desired binder-fiber ratio. The excess resin from the chamber 70 can be forced out either the inlet pipe 82 or the vacuum conduit 92. Thereafter, the compression plate 86 is removed, and the preform is placed in a magazine according to the prodecures previously described.

As previously explained, it is possible to b-stage certain resins, as for example epoxy resins, by passing a gas through the preform. In the apparatus shown in FIG. 12, the upper and lower ends of a cylindrical magazine 96 are provided with suitable O-ring seals 98. A cover 100 is placed over the upper end of the magazine with the cylindrical flange 102 of the cover effecting a seal with the O-ring 98. An outlet conduit 104 for the cover communicates with a recirculating fan, not shown, the discharge of which communicates with the supply conduit 106 of a bottom magazine cover 108. The cover 108 is identical with the top cover 100 and its rim 110 effects a seal with respect to the bottom O-ring 98. The respective ones of a pair of identical retaining plates 112 having suitable passageways between their opposite faces are positioned in the respective ends of the magazine, and a plurality of preforms 114 that are separated by cylindrical discs of a plastic screen material are held compressed between the retaining plates 112. Suitable detents not shown are provided between the retaining plates 112 and the magazine to hold the preforms 114 in the magazine until such time as the preforms are unloaded into the part forming compression molds. In the case of an epoxy binder, a known amount of a gaseous amine is added to the stream of gases that is recirculated through the magazine. After a period of time the gaseous amine is substantially completely absorbed by the preforms, and the top and bottom covers 100 and 108 are removed. The magazine is then moved to the compression mold and the covers are put onto another magazine, and the process is repeated.

EXAMPLE 2

The process of Example 1 is repeated except that the binder forming material is replaced with 104 parts of an epoxy binder forming material comprising the following ingredients in parts by weight:

| Epoxy prepolymer | 72 |
| Curing agent (Metaphenylene Diamine) | 3 |
| Acetone | 25 |

The epoxy prepolymer has an epoxy equivalent of 474-525 and the following formula:

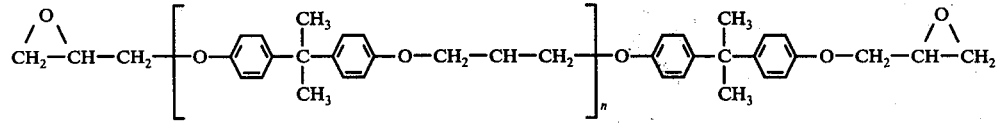

wherein $n = 2.5$ average 118.5 Parts of 1 inch long chopped glass fibers of the type used in Example 1 are placed on top of the resin in the mold and a preform is produced.

The preform was b-staged by deying to remove most of the acetone at which time the binder forming material had a viscosity of 80 million centipoise. The molded part had substantially the same properties as did those of Example 1 except that at 200° F., the tensile strength had decreased to 13,000 psi..

EXAMPLE 3

The process of Example 1 was repeated except that the binder forming material had the following composition:

| | |
|---|---|
| Epoxy-Novalac resin (Durez 11078) E.E.W. 172-179 | 200 grams |
| Diethylamine tetraamine | 9 grams |
| Isopropyl alcohol | 100 grams |
| Acetone | 50 grams |

The material was placed in a 7 inch diameter mold and 300 grams of one inch long chopped strand of the type used in Example 1 was fed into the mold. The binder forming material had a viscosity of 2,000 centipoise and on drying to remove most of the alcohol and acetone, it had a viscosity of above 80 million centipoise. The preform was dried at 50° C for 7 hours and the preform was molded using a force of 4,000 pounds and a temperature of 350° F. The molded part had uniform distribution of the fibers and a tensile strength of 16,000 psi and a flexural strength of 42,000 psi.

EXAMPLE 4

The process of Example 3 is repeated except that the binder forming material was replaced by a blend of the following materials in parts by weight:

| | |
|---|---|
| Vinyl ester (Dow XD 7608.02) | 100 |
| Styrene | 5 |
| Tertiary Butyl Perbenzoate | 1 |
| Peroxide USP 245 | 0.1 |
| Mold release agent (Zinc Stearate) | 4 |
| Mg (OH)$_2$ Thickening agent | 5 |

The vinyl ester has the following formula:

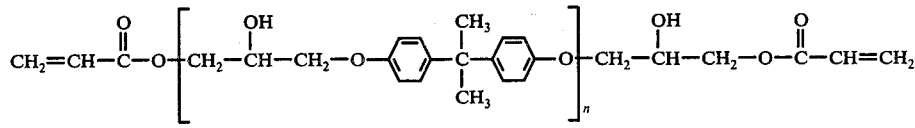

wherein $n$ has an average value of 1.5

The preform was maturated using the procedure of Example 1 and the part produced had substantially the same strength as did those of Example 1.

It will now be seen that the processes of the present invention can be performed using any thermoplastic or thermosetting binder forming materials, as for example polyesters, epoxies, polyimides, polycarbonates, polyamides, aldol condensates, such as phenol formaldehyde, urea formaldehyde, the addition polymers such as polyolefins, polyvinyls, and silicones etc.. Any type of thickening mechanism for converting the binder forming liquids to a deformable solid can be used as for example by the removal of solvent. As previously indicated, liquid binder forming materials having a viscosity between 300 and 8,000 centipoise can be used to wet out the fibers. For better retention and air removal it preferably has a viscosity between 800 and 4,000 centipoise, and most preferably a viscosity between 1,000 and 2,000 centipoise. After maturation, binders having a viscosity of more than 20 million centipoise will begin to carry fibers therewith when extruded, and in order to prevent a blotchy appearance in the extruded state, should have a viscosity between 60 million and 200 million centipoise, and most preferably between 80 million and 120 million centipoise.

Figure 13:
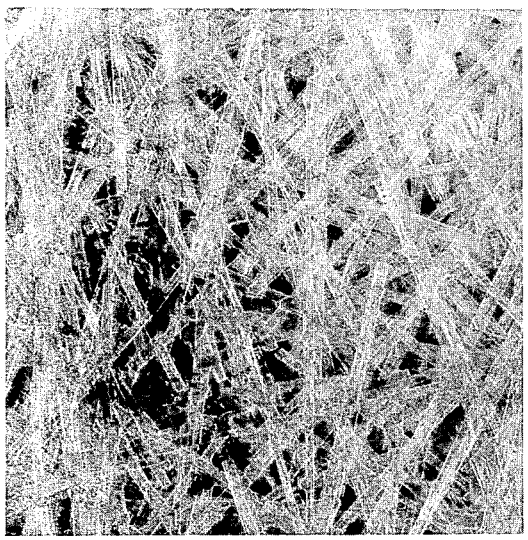
FIG. 13 is a photographic enlargement of the top surface of the preform shown in FIG. 14.
Figure 14:
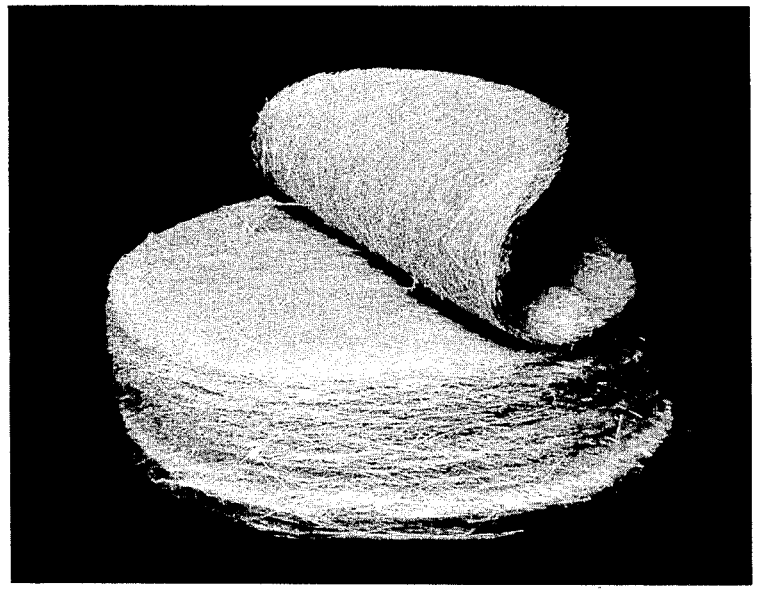
FIG. 14 is a side photographic view of a preform embodying principles of the present invention and showing a top layer being peeled back.
Figure 15:
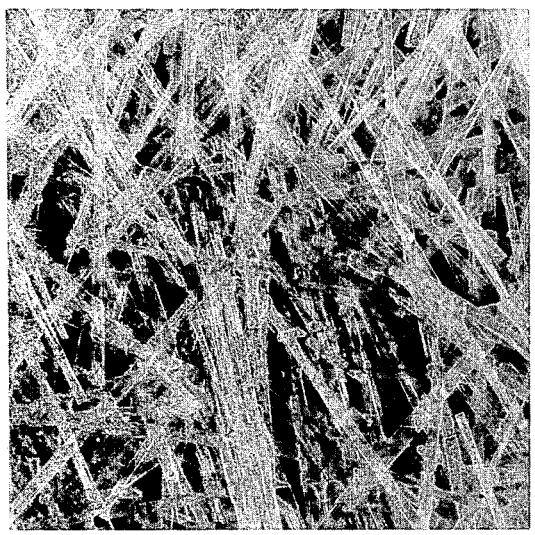
FIG. 15 is a photographic enlargement of a portion of the surface exposed by the peeling action seen in FIG. 14.

It will now be seen that the processes above described have many inventive aspects. Not only are the sequence of production steps above described capable of higher production rates than are prior art processes, but they produce new and improved preforms having precise fiber-binder ratios, new and improved billets that are subdivided into identical increments, and new and improved magazines comprising a number of the improved preforms. In addition they provide a new fiber lay that to applicants' knowledge has not been produced heretofore by any process. FIGS. 13 through 15 of the drawings show this new fiber lay.

A preform made by the apparatus shown in FIGS. 1 through 5, and the procedure described in Example 1, is shown in FIG. 14. FIG. 14 is a photograph of the 10 inch diameter preform described in Example 1 with a randomly selected top fraction of the preform being peeled back to illustrate the lay of the fibers. A photographic enlargement at a magnification of approximately 3 (FIG. 13) was made of the top surface of the preform shown in FIG. 14. FIG. 13 shows that all of the strands are straight, horizontal and randomly oriented in the horizontal plane containing the strand. The maximium deviation from horizontal which the strands will have is usually less than approximately 3° and with the largest diameter of commercial strand will be no more than approximately 6° as determined by the midpoint of one strand resting on another strand. The top surface of the preform is absolutely void of all wads or conglomerates, and clearly shows that the strands were laid down in their horizontal, at rest, positions while unrestrained by other strands. The strands of the preform were wetted with thickened binder forming material having a viscosity of approximately 80 million centipoise, and this material tacks the strands together at their crossover points.

It is possible to peel the preform shown in FIG. 14 into top and bottom fractions thereof at any elevation of the preform by lifting fibers that are exposed at any edge of the preform to separate the lifted fibers from the fibers beneath. The lifted fibers are adhered to crossing fibers at a number of locations so that it is easier to sequentially pull apart the crossover adhesions than it is to pull a strand lengthwise out of the pack. The lifted fibers in turn raise the crossover strands on top thereof, and these crossover strands in turn transfer the lifting action to other lengthwise oriented strands which extend in the direction of the peeling action, and the process is repeated to thereby sequentially break adhesions in the direction of the peeling action. As previously indicated, this can be done at any elevation of the preform.

FIG. 15 is a photographic enlargement at a magnification of approximately 3 of the lower exposed surface seen in FIG. 14. FIG. 15 is practically identical to FIG. 13 in that all of the strands seen therein are straight, horizontal and randomly oriented within the horizontal planes of the strands. FIGS. 13 and 15 make it evident that the strands are not looped back upon themselves to thereby prevent endwise removal from the preform. It is clear therefore that when the preform is heated and pressed between surfaces of a mold, the resin becomes more flowable and that the strands can be easily forced endwise by the compacting pressure. The strands will bend and flow with the thick viscous binder forming material since they are unanchored, and are unrestrained laterally by other strands. While endwise extrusion of the strands is not the only manner in which the strand can move, it does explain the ability which the preforms of the present invention have of flowing strand lengthwise into ribs and fillets. That such action was possible was not foreseen by applicants prior to testing of the preforms of the present invention. Preforms have been made of ½ inch chopped strand, 1 inch chopped strand and 2 inch chopped strand.

While the invention has been described in considerable detail, I do not wish to be limited to the particular embodiments shown and described; and it is my intention to cover hereby all novel adaptations, modifications and arrangements thereof which come within the practice of those skilled in the art to which the invention relates, and which come within the purview of the following claims.

We claim:

1. The method of making a glass fiber preform comprising: providing a mold having an enclosed chamber, said enclosed chamber having a vented opening at its upper end, providing a filling tube with its lower end projecting down into the vent opening of said enclosed chamber so that air entering said filling tube changes direction approximately 180° to escape from the mold, directing a stream of chopped glass fibers and air into said filling tube, controlling the amount of air passing through said filling tube to distribute the chopped fibers in a controlled layer across the bottom of said mold, said fibers being distributed in a randomly oriented manner with the longitudinal axes of said fibers being substantially planar, compressing said layer to a controlled degree, bonding the fibers of said layer together with a resinous material to provide a preform, and removing said preform from the mold.

2. The method of claim 1 wherein the upper end of said filling tube is funnel-shaped, wherein air is fed to said filling tube as a curtain of air introduced along the sidewalls of said filling tube, and wherein said stream of chopped glass fibers is directed downwardly into the center of said funnel-shaped upper end of said filling tube.

3. A method comprising: compressing a predetermined amount of fiber in a preform mold to a volume wherein the voids between the fibers correspond to the volume of resin that is desired, said fibers being deposited in a randomly oriented manner with the longitudinal axes of said fibers being substantially planar, filling the voids between the fibers with a liquid b-stageable resin forming material while the fibers are compressed to provide a preform, said resin material having a viscosity in the range of 300 to 8000 centipoise when said material fills the voids between said fibers, removing the preform from the mold, advancing the cure of said resin in the preform to the b-stage to increase the viscosity of said resin above approximately 20 million centipoise, said b-staged resin having a viscosity sufficient to cause said fibers in the preform to flow with said resin during molding, placing the preform between opposing mold surfaces having shaped surfaces, and forcing said mold surfaces together until the volume of materials in said preform equals the volume remaining between said mold surfaces.

4. The method of claim 3 wherein said liquid b-stageable resin comprises a polyester prepolymer and a metal oxide thickening agent.

* * * * *